United States Patent [19]

Eason et al.

[11] Patent Number: 4,770,380

[45] Date of Patent: Sep. 13, 1988

[54] COLLAPSIBLE KEYBOARD STAND

[75] Inventors: Donald H. Eason, Fort Collins, Colo.; Thomas E. Rosendahl, Chapel Ill.; Jon L. Lindskog, Fort Collins, Ill.; Thomas E. Rosendahl, Chapel Hill, N.C.

[73] Assignee: Ultimate Support Systems, Inc., Fort Collins, Colo.

[21] Appl. No.: 65,283

[22] Filed: Jun. 22, 1987

[51] Int. Cl.⁴ .................................... F16M 11/32
[52] U.S. Cl. .................................. 248/165; 84/441; 248/188.6; 248/434; 248/439; 248/460
[58] Field of Search .............. 248/165, 166, 434, 439, 248/188.6, 460, 170, 173, 150; 84/441

[56] References Cited

U.S. PATENT DOCUMENTS

| | | | |
|---|---|---|---|
| 3,062,494 | 11/1962 | French | 248/188.7 X |
| 3,313,505 | 4/1967 | Petrie | 248/165 |
| 4,010,922 | 3/1977 | Heller et al. | 248/165 |
| 4,215,839 | 8/1980 | Gibran | 248/170 |
| 4,407,182 | 10/1983 | Biasini | 248/170 X |
| 4,634,090 | 1/1987 | Currie et al. | 248/165 X |

*Primary Examiner*—Ramon O. Ramirez
*Attorney, Agent, or Firm*—Dean P. Edmundson

[57] ABSTRACT

A collapsible keyboard stand is described which also serves as its own carrying case. The keyboard stand includes (a) an upright support column which includes a cavity at each end, (b) a handle member attached to the column between its upper and lower ends, (c) an openable cover at the upper end of the column, (d) at least two arm members detachably mounted on the support column to define a horizontal support for a keyboard, (e) at least three leg members pivotably attached to the lower end of the support column. The leg members are pivotable to a position parallel to the longitudinal axis of the support column and can be slidably received within the lower end of the support column for storage. The arm members can be detached and placed into a cavity at the upper end of the column for storage and transport. The leg members support the column in a manner such that it leans forwardly.

26 Claims, 8 Drawing Sheets

COLLAPSIBLE KEYBOARD STAND

FIELD OF THE INVENTION

This invention relates to stands and supports for musical keyboard instruments. More particularly, this invention relates to keyboard stands which are collapsible and intended to be transported between various locations for use.

BACKGROUND OF THE INVENTION

Keyboard stands of various types have been used previously. Typically such stands consist of multi-legged structures and devices. Some of such structures are foldable for transport and storage. Other such structures and devices may be disassembled for transport or storage.

However, there has not heretofore been provided a collapsible keyboard stand which can serve as its own carrying case and which has other additional advantages.

SUMMARY OF THE PRESENT INVENTION

In accordance with the present invention there is provided a unique keyboard stand which is collapsible and which serves as its own carrying case. The keyboard stand includes (a) an upright support column, (b) a handle member attached to the support column, (c) a cover member for covering one or more cavities at the upper end of the support column, (d) a plurality of arm members which can be detachably connected to the support column to defire one or more horizontal supports for keyboards, and (e) at least three leg members pivotably attached to the lower end of the support column. The support column leans forwardly, i.e., the upper end of the support column extends outwardly over the leg members.

The leg members are pivotably attached to the lower end of the support column. The leg members can be pivoted to a position parallel to the axis of the column, and from that position the leg members can be slidably received within the lower end of the support column for storage.

The arm members can be detached and placed into one or more cavities at the upper end of the support column for storage and transport.

Preferably one face of the support column includes a groove extending from the upper end to the lower end thereof. The handle member is adapted to slidably engage the groove and be retained therein. Mounting members or brackets for the support arms are also adapted to be retained in the groove. Optionally, one or more clip members may be secured to the support column for serving as means for retaining a power cord for the keyboard so that the power cord is not visible from the front of the stand and so that the cord is out of the way when a keyboard is being used on the stand.

The keyboard stand of this invention is very compact in design and also serves as its own carrying case. The arm members can be detached and stored in cavities at the upper end of the support column, and the legs can be slidably inserted into cavities at the lower end of the column. The set-up or break-down time involved is very short, and the procedure for set-up or break-down is simple and easily master. No separate containers or carriers are required.

Other advantages of the collapsible keyboard stand of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
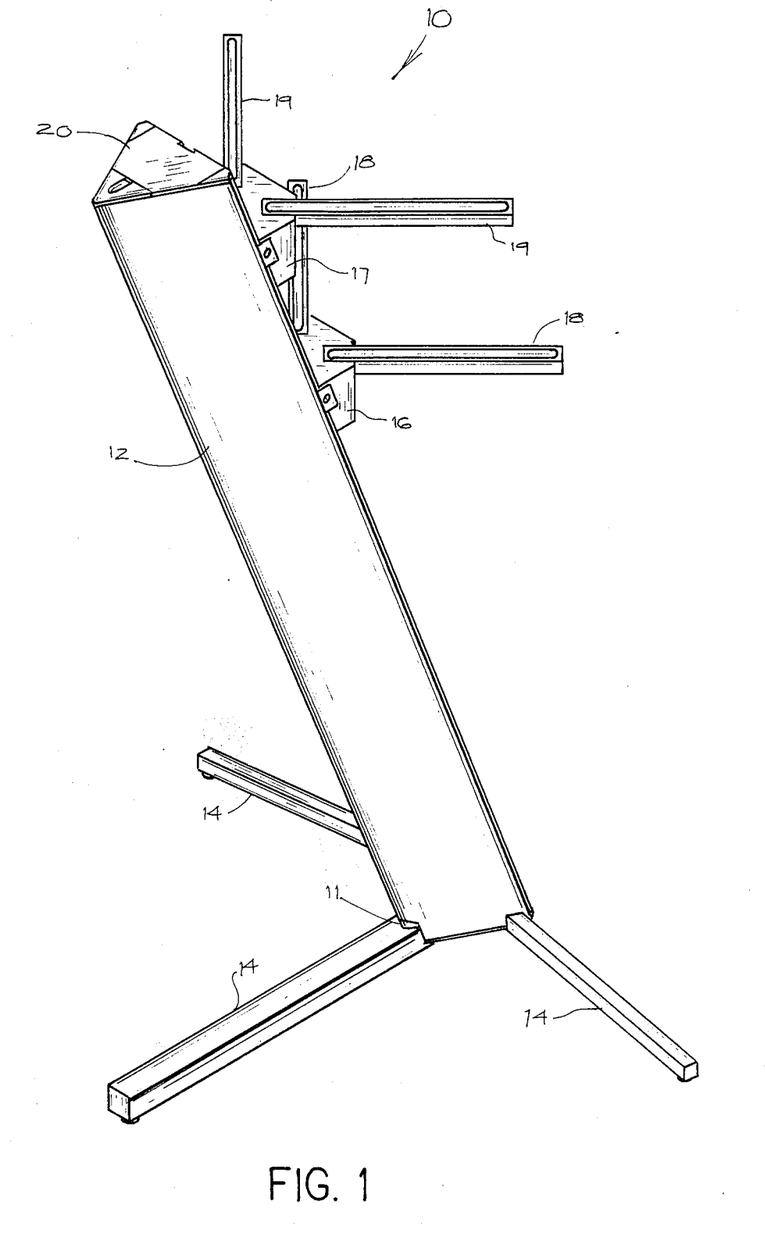
FIG. 1 is a perspective view of a collapsible keyboard stand of the invention.
Figure 2:
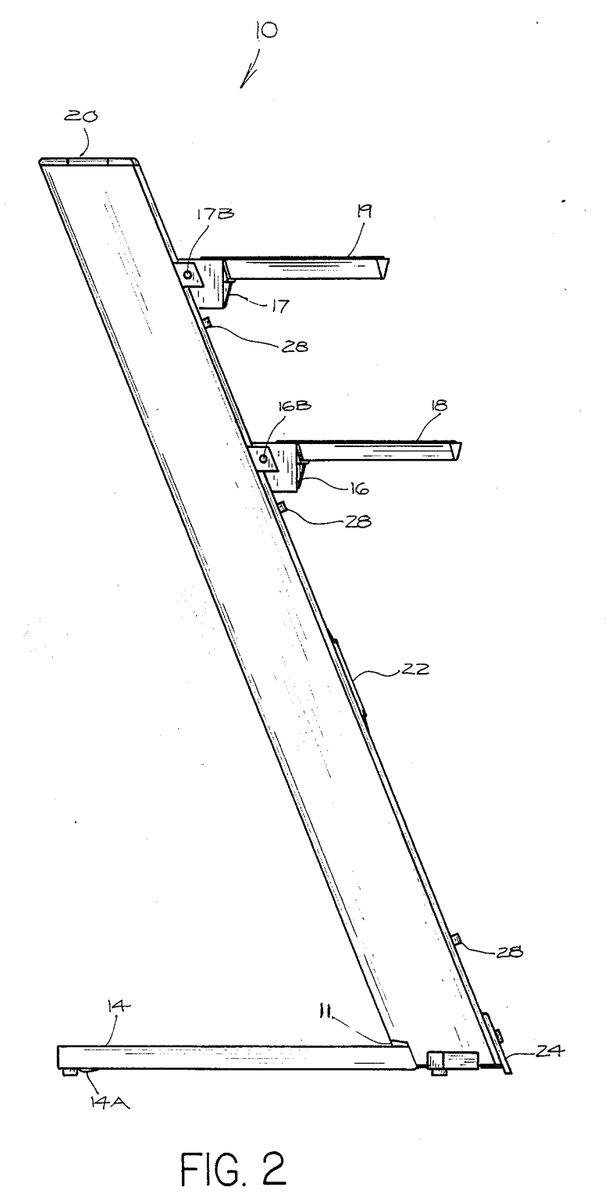
FIG. 2 is a side elevational view of the keyboard stand shown in FIG. 1.
Figure 4:
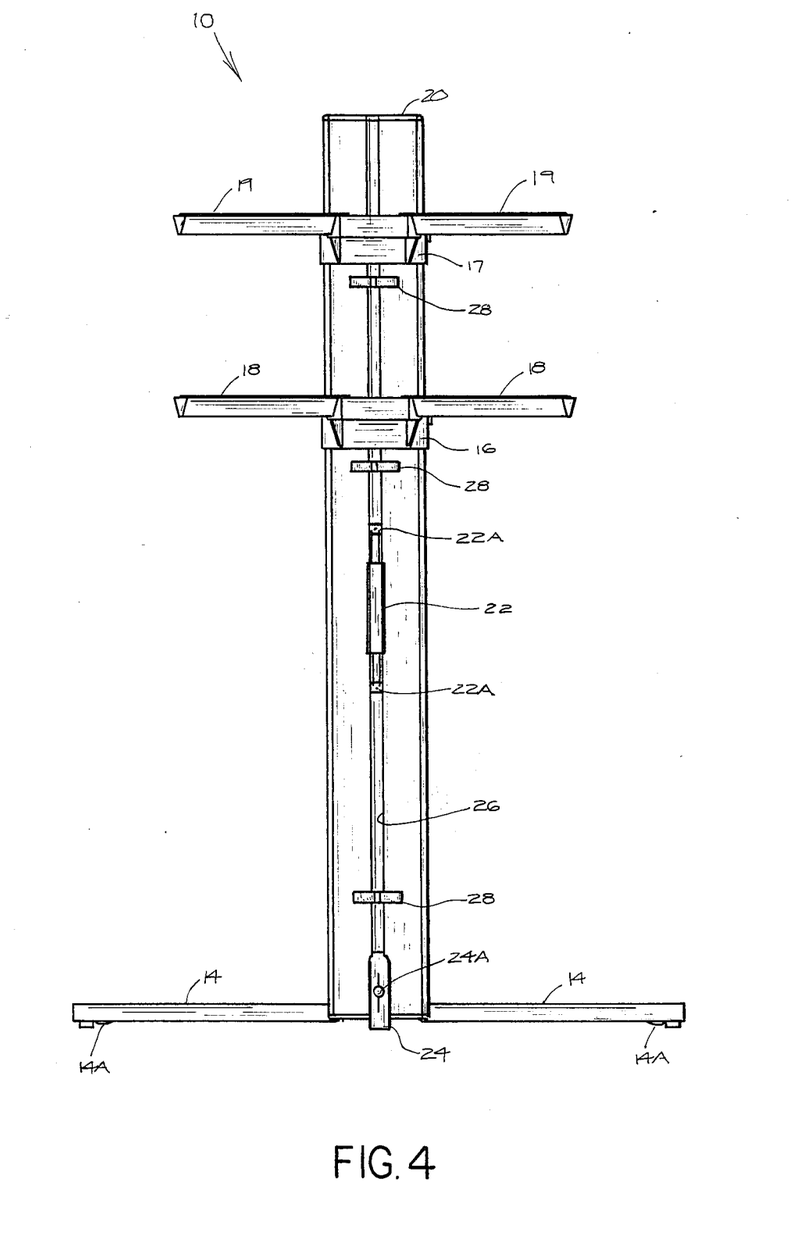
FIG. 4 is a rear elevational view of the keyboard stand shown in FIG. 1.
Figure 6:
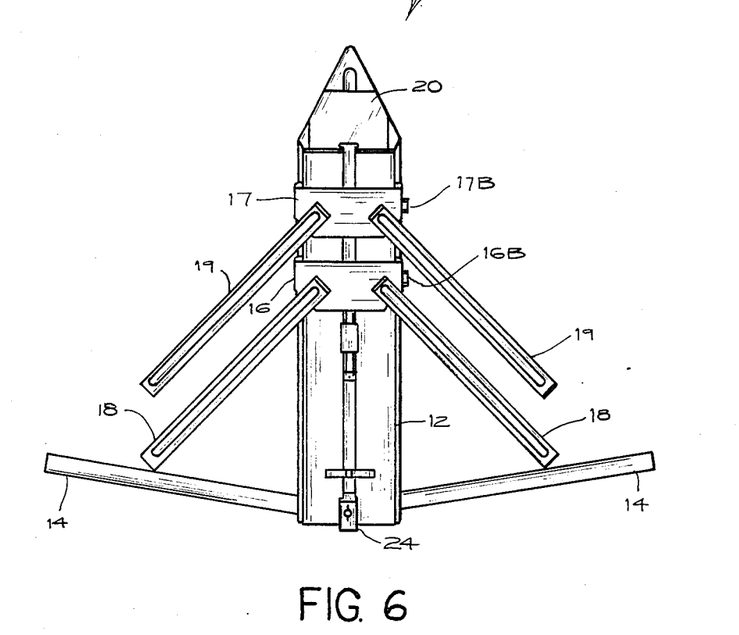
FIG. 6 is a top view of the keyboard stand shown in FIG. 1.
Figure 7:
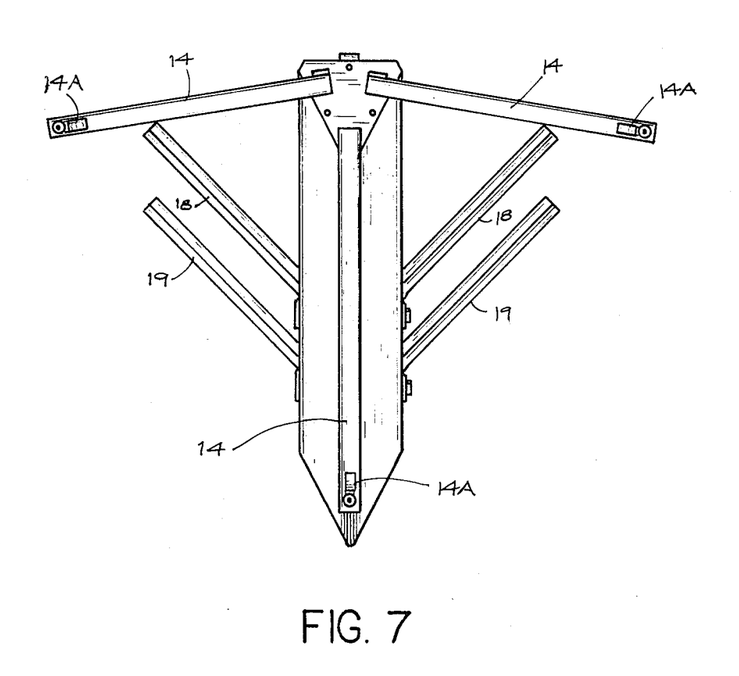
FIG. 7 is a bottom view of the keyboard stand shown in FIG. 1.

In the drawings there is illustrated one embodiment of collapsible keyboard stand 10 of the invention. FIG. 1 is a front perspective view, FIG. 2 is a side elevational view, FIG. 4 is a rear elevational view, FIG. 6 is a top view, and FIG. 7 is a bottom view.

Figure 5:
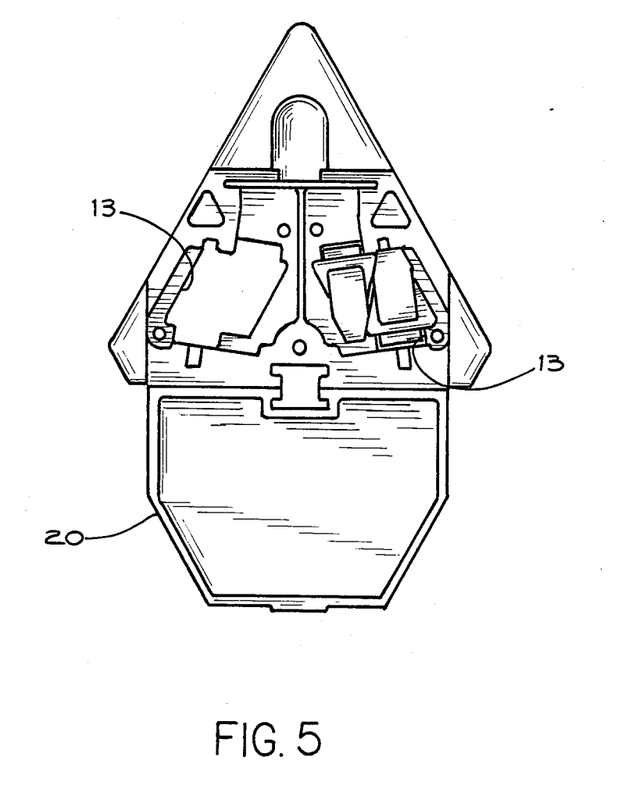
FIG. 5 is a top view illustrating the manner in which the arm members are slidably received in cavities at the upper end of the support column.

The keyboard stand 10 includes an upright support column 12. The upper end of the column includes one or more cavities 13 (illustrated in FIG. 5) in which the detachable arm members 18 and 19 may be slidably inserted for storage and transport. The upper end of the support column preferably includes a cover member 20 which may be hinged to the upper end of the column.

Figure 8:
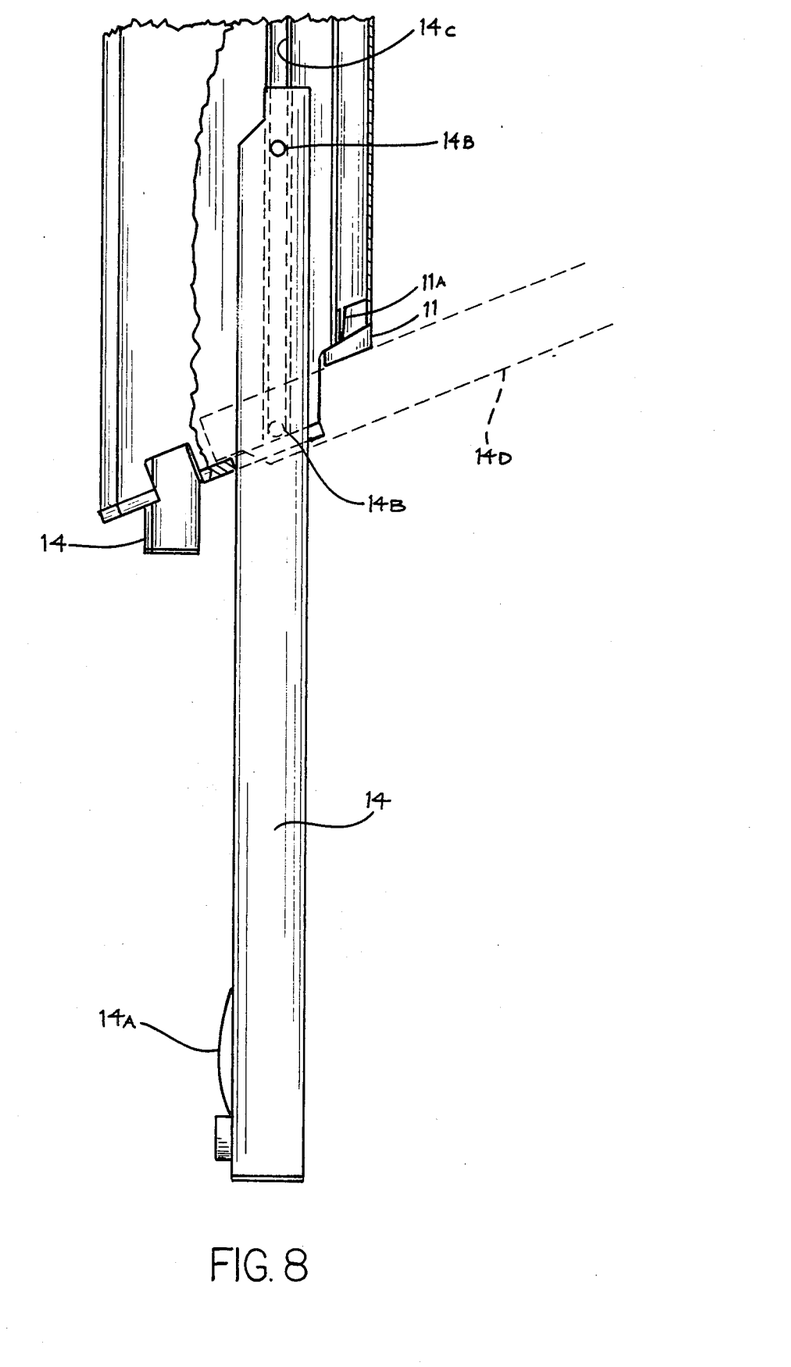
FIG. 8 illustrates the manner in which the legs can be slidably inserted into the lower end of the support column for storage and transport.

There are at least three leg members 14 pivotably attached to the lower end of the support column. The leg members are pivotably attached to the lower end of the column as illustrated in FIG. 8 in a manner such that each leg may be pivoted to a position at which the longitudinal axis of each leg is parallel to the longitudinal axis of the column. From this position each leg can be slidably inserted into the column for storage and transport.

If desired, there may be a separate longitudinal cavity within the support column to receive each leg member, as illustrated. In the partial cut-away view of FIG. 8 one of the leg members 14 is shown fully inserted into one such cavity within the support column. Another leg member 14 is shown in a position where it is parallel to the axis of the column. Dotted lines 14D illustrate the position occupied by a leg 14 when the keyboard stand is supported by the legs. A pin 14B extends through the inner end of each leg 14 and guides the inner end of each leg along a track 14C within the support column.

The outer end of each leg member 14 preferably includes a ramp 14A which wedges against the side of the cavity in which the leg is inserted in the support column. This helps to retain the leg in the cavity for storage and transport purposes.

FIG. 8 also illustrates the position of optional wedge member 11 which is detachably mounted to the lower end of the support column on the front edge thereof. The wedge 11 includes a shank 11A which is inserted into an aperture at the lower end of the column, as illustrated.

The purpose of inserting wedge 11 into the lower end of the support column is to change the angle of the forward tilt of the support column. When the wedge 11 is not used the support column leans farther forward than when the wedge is present at the lower end of the support column.

Each pair of arm members 18 and 19 define a horizontal support for a keyboard. There is at least one pair of such arm members, and there may be as many as desired. The drawings illustrate two such pairs of arm members.

Each pair of arm members is preferably detachably mounted to a mounting block or clamp. Thus, arm members 19 are detachably mounted to clamp 17, and arm members 18 are detachably mounted to clamp 16.

Figure 3:
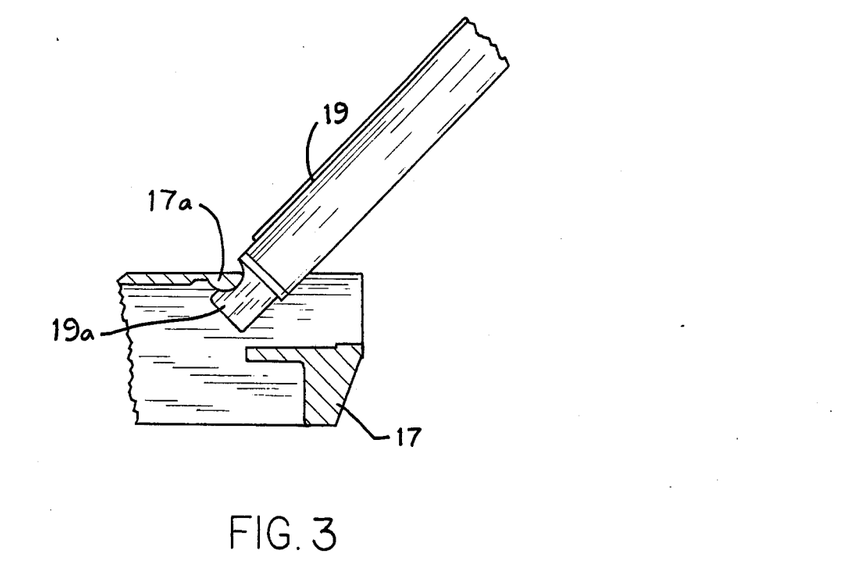
FIGS. 3 and 3A illustrate one manner in which the arm members are detachably supported on the keyboard stand.
Figure 3A:
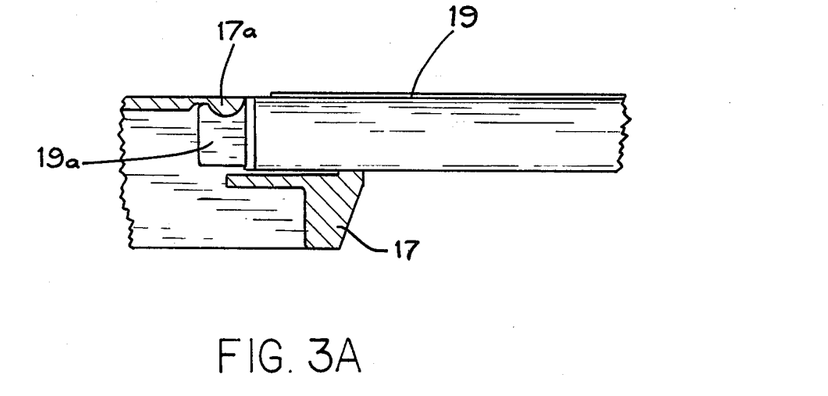

FIGS. 3 and 3A illustrate one manner in which an arm member 19 is detachably mounted to block or clamp 17. The inner end 19A or arm 19 includes a hook member, as illustrated. Clamp 17 includes a rib member 17A which may be engaged by the hook on end 19A of arm 19 when arm 19 is lowered to a horizontal positio. The rib 17A presents the arm 19 from slipping out of the clamp 17.

FIG. 4 illustrates the longitudinal groove 26 which extends along one face of the support column from the lower end to the upper end. The cross-sectional configuration of the groove may be T-shaped, dovetail, etc. so long as it is capable of engaging and retaining a complementary shaped anchor carried by the clamps 16 and 17. In this manner, each clamp anchor may be slid onto the groove at the upper end of the support column and then positioned at the desired height. A threaded screw 16B and 17B, respectively, on clamps 16 and 17 may then be tightened to secure the clamps to the support column.

Also secured in the groove 26 are clip members 28 which are useful for holding a power cord adjacent one face of the support column. Thus, the clip members prevent the power cord from becoming entangled or otherwise getting in the way of the person playing a keyboard supported on the stand.

Figure 9:
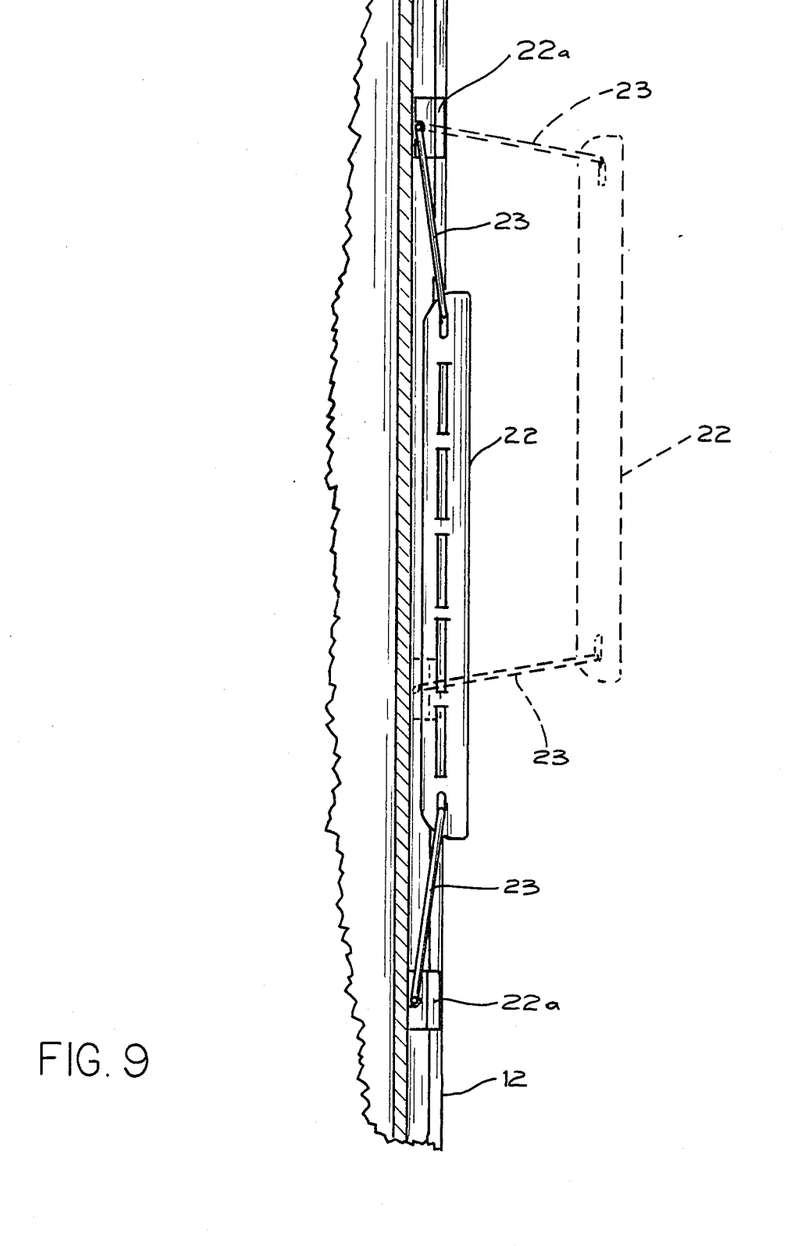
FIG. 9 illustrates the manner in which the handle is retractable into a groove in one face of the support column.

A retractable handle member 22 is also secured in the groove 26 by means of movable anchors or fasteners 22A. Link members 23 connect each end of the handle 22 to the fasteners 22A. When the fasteners 22A are loosened and moved away from each other in groove 26, the handle 22 is retracted into the groove. When the fasteners 22A are moved toward each other, the handle 22 is urged out of the groove to a usable position. This is illustrated in FIG. 9, where the dotted lines illustrate the handle in its outer position.

At the lower end of groove 26 there is a movable support member 24. This support member may be loosened by means of threaded screw 24A so as to permit the support member to be moved upwardly or downwardly, as desired. When the support member is moved downwardly to rest upon the floor or other surface on which the stand is supported, and after the screw 24A is tightened, the member 24 prevents the support column 12 from leaning rearwardly at any time. Thus, member 24 helps to stabilize the support column.

The support column is preferably triangular in cross-section, as illustrated, although other cross-sectional configurations could also be used, if desired. For example, the column could be semi-circular, oval, square or rectangular, etc.

The length of the support column may also vary. Typically, useful lengths are in the range of about 24 to 60 inches.

There are at least three leg members and there could be more, if desired, although there is no reason to have additional leg members. The length of the leg members is typically in the range of about 13 to 18 inches. The degree of forward tilt of the support column during use is preferably about 10° to 30°, and more preferably is about 21°.

The apparatus of the invention is particularly useful as a keyboard stand, although other areas of utility are also available. For example, the stand may be useful as a podium or lectern, a drum stand, a table or shelf support, etc. The support column could also be made to telescope vertically, if desired. The apparatus may be made of any suitable material (e.g., aluminum, steel, impact-resistant plastic, or combinations thereof).

Other variants are possible without departing from the scope of the present invention.

What is claimed is:

1. A collapsible keyboard stand comprising:
   (a) an upright support column having an upper end and a lower end;
   (b) at least two arm members supported by said support column; wherein said arm members define a horizontal support for a keyboard;
   (c) a plurality of leg members which are attached to said lower end of said support column; wherein said leg members are adapted to be slidably received within said support column; and wherein said leg members are adapted to support said column in a manner such that said column leans forwardly;
wherein said upper end of said column includes at least one cavity, wherein said arm members are detachable form said column and are adapted to be inserted into said cavity for storage; further comprising a cover member, wherein said cover member is hinged to said upper end of said support column.

2. A collapsible keyboard stand in accordance with claim 1, wherein said support column has a triangular cross-section.

3. A collapsible keyboard stand in accordance with claim 1, further comprising a clamp member which slidably engages said support column; wherein said arm members are adapted to be detachably supported by said clamp member.

4. A collapsible keyboard stand in accordance with claim 1, wherein there are four said arm members; wherein two of said arm members are detachably supported by said support column to define a first horizontal support for a first said keyboard; and wherein the other two of said arm members are detachably supported by said support column to define a second horizontal support for a second said keyboard.

5. A collapsible keyboard stand in accordance with claim 1, wherein said support column is adapted to lean forwardly at an angle in the range of about 10° to 30°.

6. A collapsible keyboard stand in accordance with claim 5, wherein said lower end of said support column further includes a detachable wedge member-- which is adapted to reduce said angle.

7. A collapsible keyboard stand in accordance with claim 1, wherein said lower end of said support member includes three cavities, each said cavity being adapted to slidably receive one of said leg members; wherein said leg members are adapted to frictionally engage said cavities when said leg members are fully inserted therein.

8. A collapsible keyboard stand comprising:
(a) a tubular upright support column having an upper end and a lower end; wherein said upper end includes a plurality of cavities; wherein one face of said column includes a longitudinal groove extending along said face from said upper end to said lower end;
(b) a handle member attached to said support column between said upper and lower ends;
(c) at least two arm members adapted to be detachably supported by said support column; wherein said are members define a horizontal support for a keyboard;
(d) at least three leg members which are pivotably attached to said lower end of said support column; wherein said leg members are adapted to pivot to a position at which the longitudinal axis of each said leg member is parallel to the longitudinal axis of said support column, from which position said leg members are adapted to be slidably received within said support column;
wherein said arm members are adapted to be inserted into said cavities at said upper end of said support column for storage; and wherein said leg members are adapted to support said column in a manner such that said column leans forwardly at an angle in the range of 10° to 30°.

9. A collapsible keyboard stand in accordance with claim 8, wherein said tubular support column has a triangular cross-section.

10. A collapsible keyboard stand in accordance with claim 8, further comprising a cover member hinged to said upper end of said support column.

11. A collapsible keyboard stand in accordance with claim 8, wherein said handle member includes first and second attachment means adapted to slidably engage said groove, wherein each said attachment means is adapted to be locked at a desired position along said groove; and wherein said handle member is pivotably connected at its ends to said first and second attachment means in a manner such that said handle member is adapted to fit within said groove when said first and second attachment means are moved in opposite directions in said groove.

12. A collapsible keyboard stand in accordance with claim 8, wherein there are four said arm members; wherein two of said arm members are detachably supported by said support column at said upper end to define a first horizontal support for a first said keyboard; and wherein the other two of said arm members are detachably supported by said support column to define a second horizontal support, below said first horizontal support, for a second said keyboard.

13. A collapsible keyboard stand in accordance with claim 8, wherein said lower end of said support column further includes a detachable wedge member which is adapted to reduce said angle.

14. A collapsible keyboard stand in accordance with claim 8,. further comprising at least one clip memher adapted to slidably engage said groove; wherein said clip member is adapted to detachably secure a power cord for said keyboard.

15. A collapsible keyboard stand in accordance with claim 8, wherein said lower end of said support member includes three cavities, each said cavity being adapted to slidably receive one of said leg members; wherein said leg members are adapted to frictionally engage said cavities when said leg members are fully inserted therein.

16. Support structure comprising:
(a) an upright support column having an upper end and a lower end;
(b) at least two arm members suppored by said support column; wherein said arm members define a horizontal support surface;
(c) support means attached to said lower end of said support column;
wherein said support means is adapted to support said column in a manner such that said column means forwardly; wherein said lower end of said support column further includes means for defining the angle of which said column leans forwardly.

17. A collapsible keyboard stand in accordance with claim 16, wherein said support column has a triangular cross-section.

18. A collapsible keyboard stand in accordance with claim 16, wherein there are four said arm members; wherein two of said arm members are detachably supported by said support column to define a first horizontal support surface; and wherein the other two of said arm members are detachably supported by said support column to define a second horizontal support surface.

19. A collapsible keyboard stand in accordance with claim 16, wherein said support column is adapted to lean forwardly at an angle in the range of about 10° to 30°.

20. A collapsible keyboard stand in accordance with claim 19, wherein said means for defining said angle comprises a detachable wedge member which is adapted to reduce said angle.

21. A collapsible keyboard stand in accordance with claim 16, wherein said support means comprises three leg members; wherein said lower end of said support member includes three cavities, each said cavity being adapted to slidably receive one of said leg members; wherein said leg members are adapted to frictionally engage said cavities when said leg members are fully inserted therein; wherein said upper end of said support column includes at least one cavity; and wherein said arm members are adapted to be inserted into said cavity at said upper end of said support column for storage.

22. A collapsible keyboard stand in accordance with claim 21, further including cover members adapted to cover said cavities at said upper and lower ends of said support column.

23. A collapsible keyboard stand comprising:
(a) an upright support column having an upper end and a lower end;
(b) at least two arm members supported by said support column; wherein said arm members define a horizontal support for a keyboard;
(c) a plurality of leg members wqhich are attached to said lower end of said support column; wherein said leg members are adapted to be slidably received within said support column; and wherein said leg members are adapted to support said column in a manner such that said column leans forwardly;
wherein one face of said column includes a longitudinal groove extending along said face from said upper end to said lower end; and further comprising a handle member which is adapted to be slidably engaged in said groove.

24. A collapsible keyboard stand in accordance with claim 23, wherein said handle member includes first and second attachment means adapted to slidably engage said groove, wherein each said attachment means is adapted to be locked at a desired position along said groove.

25. A collapsible keyboard stand in accordance with claim 24, wherein said handle member is pivotably connected at its ends to said first and second attachment means in a manner such that said handle member is adapted to fit within said groove when said first and second attachment means are moved in opposite directiosn in said groove.

26. A collapsible keyboard stand in accordance with claim 23, further comprising at least one clip member adapted to slidably engage said groove; wherein said clip member is adapted to detachably secure a power cord for said keyboard.

* * * * *

UNITED STATES PATENT AND TRADEMARK OFFICE
CERTIFICATE OF CORRECTION

PATENT NO. : 4,770,380

DATED : September 13, 1988

INVENTOR(S) : Donald H. Eason et al.

It is certified that error appears in the above—identified patent and that said Letters Patent is hereby corrected as shown below:

On the title page:

The inventors are: Donald H. Eason, Thurman F. Hodge, Jon L. Lindskog, and Thomas E. Rosendahl.

Signed and Sealed this

Seventh Day of May, 1991

Attest:

HARRY F. MANBECK, JR.

Attesting Officer

Commissioner of Patents and Trademarks